3,388,085
FOOD COATING COMPOSITIONS COMPRISING
  ETHYLENE-VINYL ACETATE COPOLYMER
  AND ACETYLATED MONOGLYCERIDE
Henry Levkoff, New York, N.Y., and Joseph Phillips,
 Petrolia, Pa., assignors to Witco Chemical Company,
 Inc., New York, N.Y., a corporation of Delaware
No Drawing. Filed Aug. 10, 1965, Ser. No. 478,743
            18 Claims. (Cl. 260—23)

The present invention is concerned with novel coated foods and coating compositions having particular utility for such purposes. More particularly, the present invention provides novel protective strippable coating compositions for foodstuffs, said coating compositions in the form of films being transparent, flexible over a wide temperature range, highly impervious to water vapor transmission and which can be readily applied and readily removed.

There is a growing demand for the packaging of food products that will be protective and yet allow the customer to view the products that are being sold. This demand is particularly prevalent in the sale of foodstuffs but it is also applicable to other more durable goods and accordingly the search for suitable materials that can be used is widespread. The requirements of the food packaging materials are of necessity more stringent since they must protect the foodstuffs during storage, not in themselves cause any deterioration of the foodstuffs packaged, should be transparent to allow the customer to view the product on sale, be serviceable over a wide range of processing and storage temperatures, in many cases have very low air and water vapor permeability, be strong enough to withstand handling during storage, shipping and while on display and be readily applied by the processor and easily removed by the customer when ready for use.

Continuing progress in frozen food processing and packaging has evolved from sulfite cartons with a one-color-printed, waxed-paper overwrap wherein the food product was slowly frozen at temperatures of 0 degrees F. to −10 degrees F. to a one-piece, multi-color-printed carton with a high-gloss, heat-sealable hydrocarbon coating on the exterior and the food product being quick frozen at −30 degrees F. to −40 degrees F. before packaging. Two major disadvantages have persisted during this evolution; one being that the paperboard carton does not allow the customer to view what he is purchasing and secondly the size and shape of the carton are restricted by the packaging machine requirements which take precedence over the configuration and dimensions of the product itself with the attendant overpackaging and waste in storage, shipping and display space.

Conformal, transparent coatings have been used as protective coating on various materials, including foodstuffs. Acetylated monoglycerides have been proposed for and used as food coatings. Compositions of this nature are frequently referred to as hot melts. Use, in conjunction with the acetylated monoglycerides, of various other materials such as ethyl cellulose and cellulose esters such as cellulose acetate-butyrate and with or without various modifying agents such as oils, fats and waxes, also have been proposed, and some of such compositions have achieved commercial acceptance. Typical of various heretofore suggested coating compositions are disclosed, for instance, in U.S. Patents Nos. 2,745,749, 2,840,474, 2,840,476, 2,868,656, 2,951,763, and 3,000,748. However, all such procedures so far as we are aware have been deficient in one or more of such properties as strength, permeability, color, odor, stability, greasiness or strippability. Indeed, with certain of said coating compositions, not only do they possess or develop objectionable odor, generally of a rancid character but they have the effect of promoting rancidity of such fat-containing food products as bacon and dairy products when coated with said coating compositions. Furthermore, none have been adequately transparent or flexible over the wide temperature range used in food processing, especially at temperatures of −40 degrees F. and lower. Indeed, in general, heretofore known hot melt coatings craze and crack at such low temperature and lose their clarity or transparency. Moreover, none have been found to have the processibility characteristics required for use in recently developed commercial coating equipment.

It is an object of the present invention to provide novel coating compositions that are transparent, tough, remain flexible over a wide temperature range, exhibit low permeability to air and water vapor, are color-stable, odor-free, non-toxic and can be readily applied in a thin film.

It is another object of the present invention to provide novel compositions that can be applied as a hot melt and will set up rapidly as a conforming, thin, tough, transparent coating for irregularly shaped articles.

It is another object of the present invention to provide novel coating compositions for foodstuffs that are conforming, transparent, exhibit low permeability to air and water vapor, are tough, but can be readily removed, are odor-free, color-stable, non-toxic, will not cause deterioration or affect the quality and taste of foodstuffs and will remain flexible over a wide temperature range and at a temperature at least as low as −40 degrees F.

It is still a further object of the present invention to provide methods for making novel conformal coating compositions that can be used for foodstuffs and are tough, transparent, flexible, exhibit low air and water vapor permeability and can be readily applied and easily removed.

In accordance with the present invention, it has been discovered that these desiderata and many other advantages and benefits are realized with and achieved to a highly successful and surprising extent by novel coating compositions consisting essentially of acetylated monoglycerides and having dissolved therein controlled amounts of certain copolymers of ethylene and vinyl acetate, all as is hereafter described in detail. Copolymers of ethylene and vinyl acetate, of various types, sold under the trademarks Elvax, Bakelite CO-MER VA, AC-COPOLYMER and Ultrathane EVA, have heretofore been used as such or modified by the addition thereto of paraffin waxes, microcrystalline waxes, etc. as "hot melts" for the coating or packaging of foods, but they have not proven to be satisfactory as so-called hot melts to meet the numerous requirements set forth above for use in the coating of food products and particularly frozen food products.

In more particular terms, the novel coating compositions of our invention consist essentially of (1) a resinous ethylene-vinyl acetate copolymer in which the vinyl acetate content is in the range of about 22 to 35 weight percent, and especially between 26 and 30 weight percent, and with a melt index of at least 1.5, and (2) a normally liquid acetylated monoglyceride of predominately $C_{14}$–$C_{22}$ fatty acids, or commercial sources of such fatty acids, or mixtures of fatty acids as are derived from triglyceride oils or soft fats such as cottonseed oil, soya bean oil, lard, lard oil, corn oil, and the like, said ingredients (1) and (2) being in certain proportions in relation to each other. The ethylene-vinyl acetate copolymer is present in the coating compositions of our invention in a range of 45 to 60 parts thereof to from 55 to 40 parts of the acetylated monoglyceride, said parts being by weight. When these two ingredients are the only ingredients in the coating compositions, the aforesaid parts will, of course, represent the same weight percentages of each of said ingredients based on the weight of the coating composition. On the other hand, where supplemental ingredients are included in the coating compositions, as referred to hereafter, the weight parts relationship of the (1) and (2) ingredients to each other will remain the same but the weight percent thereof, based on the coating composition as a whole, will, of course, be altered.

The ethylene-vinyl acetate copolymers of the type which we have found to be useful in the preparation of the coating compositions of our invention can be prepared by known procedures as, for instance, by copolymerizing a mixture of ethylene and vinyl acetate in the presence of a catalyst such as oxygen, or an organic peroxide such as t-butyl hydroperoxide, in a tubular reactor at pressures of from about 15,000 to 30,000 p.s.i.g. and temperatures of from about 150 degrees C. to about 250 degrees C., and then separating the resultant copolymer from unreacted monomers by flashing off the unreacted monomers. By varying the conditions of pressure, temperature, catalyst concentration and vinyl acetate content in the monomer mixture, one can obtain copolymers varying in melt index over a wide range. For use in the coating compositions of our invention the melt index may be as low as 1.5 and as high as even 1000 or slightly more. However, melt indices of at least 100 and better still, of the order of about 125 to 500 are especially satisfactory, with a melt index of the order of about 400 to 450 generally being close to optimum. As stated above, ethylene-vinyl acetate copolymers are available on the commercial market under the aforesaid trademarks. Certain of said products are useful in the preparation of the novel coating compositions of our invention, namely, those in which the vinyl acetate content is in the range of about 22 to 35 weight percent, and especially 26 to 30 weight percent. It will also be understood that mixtures of two or more different preformed ethylene-vinyl acetate copolymers can be blended to obtain varying desired contents of vinyl acetate in relation to ethylene in the copolymers. Thus, for instance, equal parts by weight of an ethylene-vinyl acetate copolymer containing 28% vinyl acetate and of an ethylene-vinyl acetate copolymer containing 24% vinyl acetate can be blended to produce a copolymer mixture containing 26% vinyl acetate. Such a mixture, or a mixture of the individual copolymers, can be combined with the acetylated monoglycerides to produce the coating compositions of our present invention.

With reference to the acetylated monoglyceride constituent of our coating compositions, it may be stated that of especial utility are the normally liquid acetylated monoglycerides derived from distilled monoglycerides of vegetable or animal oils, or soft fats, such as lard, cottonseed oil and the like, referred to above, in which said distilled monoglycerides, which usually contain of the order of 90% or more of monoglycerides, are substantially completely acetylated. Illustrative of an acetylated monoglyceride which is very satisfactory for the purposes of our present invention is the acetylated monoglyceride which is sold commercially under the trademark Myvacet Type 9–40, which is an essentially completely acetylated distilled monoglyceride derived from prime lard, whose properties are as follows:

Typical physical properties

| | |
|---|---|
| Physical State | Clear, almost colorless liquid. |
| Congeal Point | 8° C. (approx.) (46° F.). |
| Refractive Index at: | |
| 50° C. (122° F.) | 1.443. |
| 40° C. (104° F.) | 1.447. |
| Viscosity at: | |
| 121° C. (250° F.) | 7 cps. |
| 50° C. (122° F.) | 19 cps. |
| 20° C. (68° F.) | 50 cps. |
| Specific Gravity at: | |
| 50° C. (122° F.) | 0.96. |
| 20° C. (68° F.) | 0.99. |

Solubility at 20 degrees C. Soluble in all common organic solvents, 80% w./w. aqueous ethanol, and vegetable and mineral oils. Less than 4% in 70% aqueous ethanol.

Typical chemical properties

| | |
|---|---|
| Iodine value | 42. |
| Saponification value | 380. |
| Percent monoglyceride | 0 to 2. |
| Reichert-Meissl value | 145. |
| Acid value | Less than 4. |
| Peroxide value | Less than 2. |
| A.O.C.S. fat stability (A.O.M.) | More than 100 hrs. to P.V. of 20. |

Other normally liquid acetylated monoglycerides can be used, particularly those which are normally clear, colorless or almost colorless liquids at room temperatures and which are essentially completely acetylated.

The acetylated monoglycerides and the ethylene-vinyl acetate copolymers, when used together pursuant to our invention, each function to modify the properties and characteristics of the other so as to produce results and effects not attainable with each individually and which could neither be foreseen nor predicted. Thus, over and above the highly desirable, and important, flexibility at low temperatures and other properties and characteristics, as described hereinabove, it has been found that the coating compositions of our present invention have unusually effective water vapor- and gas-barrier properties, a property which is of great materiality in the packaging of various foodstuffs, especially frozen meats and vegetables. Packaging importantly should serve as a barrier to the permeation of moisture from within the foodstuffs and to moisture and gases from without. In tests run on transparent films or sheets of 3 mil and of 11 mil thickness of a coating composition made from a homogeneous hot melt containing 60 weight percent of an ethylene-vinyl acetate copolymer (Xlvax 210) and 40 weight percent of an acetylated monoglyceride (Myvacet Type 9–40), water vapor transmission rates (WVTR) were determined by the T.A.P.P.I. Test Method T–448m-49; the results set forth below in Table I were obtained. It may be pointed out that, in these tests, a constant transmission rate at 83 degrees F. and 50% relative humidity is usually established within 72 hours and subsequent weight differentials over a three or four day period are averaged to give a water vapor transmission rate for a 24 hour period through the sample area. A seven day period was used to determine the original permeability data. Normally, after the test is completed, the test cup assemblies are removed from the cabinet and cleaned for re-use. However, in the present tests, the test cups were returned to the cabinet and left for a total period of 125 days. Cabinet conditions were unchanged. Permeability literature contains WVTR data calculated for either a square meter or a 100 square inch sample area. In Table I both units have been listed for ease of comparison.

TABLE I.—WATER VAPOR TRANSMISSION OF TEST FILM

| Test Film Thickness, Mils | T.A.P.P.I. T-448m-49 (73 degrees F., 50% R.H.) | | | |
|---|---|---|---|---|
| | WVTR over 7 day period, Gr. H₂O/24 hrs. | | WVTR over 125 day period, Gr. H₂O/24 hrs. | |
| | 100 in.² | Meter ² | 100 in.² | Meter ² |
| 3 | 0.61 | 9.4 | 0.35 | 5.5 |
| 11 | 0.26 | 3.3 | 0.11 | 1.7 |

As Table I shows, the rate of water vapor transmission, surprisingly, decreased with time. This result is inconsistent with the generally polar nature of ethylene-vinyl acetate copolymers and of acetylated monoglycerides.

While we have attempted to postulate reasons for the unexpectedly exceptional behavior of films of our coating compositions in regard to their water vapor transmission rates, such reasons are based upon conjectures and have not been proven and, therefore, we prefer simply to state the facts without regard to the actual mechanism of the phenomenon.

The marked advantages in the water vapor transmission rates of the Test Film of our invention, referred to above, in comparison with various known wrapping films, is indicated in Table II.

TABLE II.—COMPARISON OF VARIOUS WVTR BARRIERS

| Barrier | Thickness, Mils | T.A.P.P.I. Method | WVTR, Gr. H$_2$O/100 in.$^2$/24hrs. at 100° F., 90% R.H. |
|---|---|---|---|
| Test Film | 11 | T-448 | *0.2 |
| Waxed Kraft | 35 | T-464 | 1.7 |
| Polyethylene Film | 1.5 | T-464 | 0.9 |
| Cellophane, MST-51 | 1 | T-464 | 0.4 |
| Waxed Glassine | 1 | T-464 | 0.3 |
| Microcrystalline Wax (70%) Elvax 250 (30%) coated on 25: sulfite paper. | 1 | T-448 | *0.8 |

*Data extrapolated from 73 degrees F., 50% R.H. to 100 degrees F. 90% R.H. using method of C. L. Bricknam, p. 47–51, Package Engineering, Dec. 1961 and Jan. 1962.

Generally speaking, the coating compositions of the present invention ordinarily form molten mixtures at temperatures which are in excess of the boiling point of water but are not excessively high so as to require unusual or expensive processing equipment. Further, the coating compositions of the present invention are exceptionally stable at the melting temperatures used, thereby enabling them to be maintained at processing temperatures for extended periods of time without developing undesirable odors or deterioration of the ultimate coating properties.

The coating compositions of the present invention may be applied in any desired manner to articles which may be at any temperature beneath that of the hot melt. Surprisingly and particularly advantageously, when fresh meat products are involved, the coating composition may be applied to the article immediately after it has been subjected to freezing temperatures as low as −40 degrees F. and, indeed, even lower, and will curve rapidly to a tough, conforming, transparent coating that permits easy handling for storage and/or shipping.

Preparation of the coating compositions of the present invention is easily accomplished. The acetylated monoglyceride is simply admixed with the ethylene-vinyl acetate copolymer generally at a temperature in the range of from about 100 to about 150 degrees C. to produce a homogeneous solution.

Application of the coating compositions of the present invention is not limited to any particular method. The object to be protected can be coated by such known methods as, for example, dipping, enrobing or hot spraying. It is a particular advantage of our coating compositions that they are easily applied by falling curtain or projected film techniques such as are described, for instance, in Food Processing, February 1965. Film thicknesses are, of course, variable, and will, in general, range from about 1 mil to 20 or more mils.

The following examples are illustrative of the practice of the present invention. They are not to be construed as in any way limitative of the scope of the invention since numerous other coating compositions can readily be produced, and other coating techniques utilized, in the light of the teachings and guiding principles disclosed herein. All parts stated are by weight.

EXAMPLE 1

40 parts of an acetylated distilled monoglyceride, derived from prime lard (Myvacet Type 9–40), was heated in a steam-jacketed kettle at 220 degrees F., and 60 parts of an ethylene-vinyl acetate copolymer containing 28% vinyl acetate and having a melt index of 400 (Elvax 210) was then slowly added while the temperature was increased to and maintained at a temperature of about 280 degrees F. until all the copolymer was dissolved. A nitrogen blanket was maintained over the kettle and its contents during the entire period it was at temperature.

Using hand drawing laboratory sheet forming apparatus maintained at ambient temperatures:

(A) A portion of the hot solution was then drawn into a 20 mil thick sheet that set almost immediately into a cohesive film capable of supporting its own weight when lifted from the coated surface. The film so formed exhibited excellent clarity, was odor-free and was completely dry to the touch.

A portion of the film was aged for 8 hours at −65 degrees F. after which time the film was found to be flexible with no change in clarity.

(B) The viscosity of the acetylated monoglyceride-ethylene-vinyl acetate copolymer solution was determined to be about 15,000 cps. at 250 degrees F. After maintaining the solution at 270 degrees F. to 290 degrees F. for 48 hours under a nitrogen blanket, no appreciable change in viscosity could be measured nor was any odor found to be emitting from the hot solution. A hard-drawn film was drawn from the aged solution and no apparent change in film transparency, clarity, toughness or odor could be observed.

EXAMPLE 2

To show the effect of employing ethylene-vinyl acetate copolymers with varying contents of vinyl acetate and melt indices, a series of tests was run using coating compositions having an ethylene-vinyl acetate copolymer content of 60 weight percent and an acetylated monoglyceride content of 40 weight percent. The acetylated monoglyceride used was Myvacet Type 9–40. Typical results are shown below in Table III.

TABLE III

| Vinyl Acetate, weight percent: | Melt Index | Film Opacity | Oil Exudation |
|---|---|---|---|
| 5 | 1,000 | Could not form film. | |
| 16* | 1,000 | 4 | *4 |
| 18* | 2.5 | 2 | *2 |
| 18* | 150 | 2 | *3 |
| 20* | 1.5 | 3 | *2 |
| 24 | 185 | 2 | 2 |
| 28 | 3 | 2 | 1 |
| 28 | 150 | 1 | 0 |
| 28 | 400 | 0 | 0 |
| 33 | 25 | 2 | 1 |
| 40* | 25 | 2 | *2 |

*Low film strength was observed for these samples.

The empirical scales used to evaluate the properties of the films were as follows:

Film opacity: 0 to 4; clear to opaque, 3 being translucent, 2 and 1 representing varying improving degrees of transparency, and 0 being perfectly clear.

Oil exudation: 0 to 4; none to severe at 0 degrees and 75 degrees F.; 0—representing an absolutely dry film; 1—a dry feeling film but one which shows a fingerprint; 2—slight oiliness; 3—definite exudation of oil; 4—massive oil exudation.

Values of 2 for each of the properties of film opacity and oil exudation would be the maximum of commercial acceptability. It will be seen, from Table III, that films made from the mixture of the acetylated monoglyceride and the ethylene-vinyl acetate copolymer containing 28% vinyl acetate and having a melt index of 400 were outstanding.

EXAMPLE 3

To illustrate the effect of varying the proportion of the ethylene-vinyl acetate copolymer and the acetylated monoglyceride in the coating compositions a series of tests were run.

(A) A solution was prepared comprising 60 parts of ethylene-vinyl acetate copolymer (Elvax 210) and 40 parts of acetylated monoglyceride (Myvacet Type 9–40).

(B) A solution was prepared comprising 50 parts of the same ethylene-vinyl acetate copolymer and 50 parts of the same acetylated monoglyceride as employed in Part A of this Example 3.

(C) A solution was prepared comprising 40 parts of the same ethylene-vinyl acetate copolymer and 60 parts of the same acetylated monoglyceride employed in Part A of this Example 3.

(D) A solution was prepared comprising 60 parts of an ethylene-vinyl acetate copolymer having a vinyl acetate content of 28% and a melt index of about 150 and 40 parts of the same acetylated monoglyceride used in Part A of this Example 3.

(E) A solution was prepared comprising 50 parts of the same ethylene-vinyl acetate copolymer used in Part D of this Example 3 and 50 parts of the same acetylated monoglyceride used in Part A of this Example 3.

(F) A solution was prepared comprising 50 parts of the same ethylene-vinyl acetate copolymer used in Part D of this Example 3 and 50 parts of an essentially completely acetylated distilled monoglyceride derived from cottonseed oil and having a Saponification Value of 380, Iodine Value of 70, Reichert-Meissl Value of 145, and Congeal Point of approximately 1 degree C. (Myvacet Type 9–85).

(G) A solution was prepared comprising 60 parts of the ethylene-vinyl acetate copoylmer used in Part D of this Example 3 and 40 parts of the acetylated monoglyceride used in Part F of this Example 3.

(H) A solution was prepared comprising 60 parts of the ethylene-vinyl acetate copolymer used in Example 1 and 40 parts of the acetylated monoglyceride used in Part F of this Example 3.

(I) A solution was prepared comprising 50 parts of the ethylene-vinyl acetate copolymer used in Example 1 and 50 parts of the acetylated monoglyceride used in Part F of this Example 3.

Hand drawn films 15 to 17 mils thick were prepared from each of the above compositions, the solutions being at approximately 290 degrees F. when samples were taken for drawing. In all cases, immediate setting of the film was observed. All the films so formed, except that prepared from composition C, were tough enough to support their own weight when removed from the coating plate. Table IV summarizes Film Opacity and Oil Exudation characteristics using the same empirical scale described in Example 2.

TABLE IV

| Composition: | Film Capacity | Oil Exudation |
| --- | --- | --- |
| A | 0 | 0 |
| B | 0 | 0 |
| C | 0 | 0 |
| D | 0 | 0 |
| E | 1 | 1 |
| F | 2 | 2 |
| G | 1 | 0 |
| H | 0 | 0 |
| I | 1 | 1 |

EXAMPLE 4

(A) Frozen meat cuts were coated immediately after freezing with the coating composition of Example 1, the coating being applied by commercial equipment employing falling curtain techniques. The meat temperature was −40 degrees F. when the coating composition, at a temperature of about 300 degrees F., was applied. The coating film set almost immediately after application, allowing the packaged product to be handled very shortly thereafter. The coating was tough, clear, had no odor or greasy feel and there was no crazing or other imperfection due to the cold temperature. Several of the coated cuts were stored in the freezing compartment of a home refrigerator for several months after which time no apparent deterioration of the meat or coating could be observed. The coating was then easily removed from the surface of the meat and no oil could be observed on the surface of the meat.

(B) Frankfurters were dip-coated with the composition of Example 1 using ordinary dipping techniques. After removing the frankfurters from the coating solution, the coating dried rapidly into a tough, clear, odor- and oil-free coating. The meat could be handled readily without damaging the coating even though the coating could be readily removed from the surface without leaving a residue.

Various supplemental materials can be incorporated into the coating compositions of our invention, provided that they do not materially adversely affect the desirable properties of transparency, flexibility particularly at low temperaures, vapor barrier properties, strippability and the like. Such supplemental materials include, for instance, antioxidants, dyes, preservatives, fillers, compatible oils, plasticizers, etc. Hence, where the term "consisting essentially of" is used in the claims, it will be understood not to exclude the presence of minor proportions of materials other than those specifically recited in the claims which do not materially adversely affect such of the properties which have been referred to above.

While the coating compositions of the present invention have especial utility for the coating of foodstuffs, particularly frozen foods, they also possess utility in a wide variety of other fields. Apart from their use as a coating for foodstuffs, the advantages of which have been pointed out, many of these same characteristics make them particularly suitable for the protection and packaging of other articles of commerce where an attractive, transparent, tough, protective, odor-free coating is desirable.

What we claim as new and desire to protect by Letters Patent of the United States is:

1. In a method of preparing transparent, protective coatings on food products in which there is applied to said food products a hot-melt coating composition in molten condition to provide a film on said food products after which the coating composition is allowed to harden, the step which comprises utilizing as the hot-melt coating composition a mixture consisting essentially, in parts by weight, or from about 45 to 60 parts of an ethylene-vinyl acetate copolymer containing from about 22 to 35% of vinyl acetate, and from about 55 to 40 parts of a normally liquid substantially completely acetylated monoglyceride of predominately $C_{14}$–$C_{22}$ fatty acids.

2. In a method of preparing transparent, protective coatings on frozen food products in which there is applied to said frozen food products a hot-melt coating composition in molten condition to provide a film on said food products after which the coating composition is allowed to harden, the step which comprises utilizing as the hot-melt coating composition a mixture consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

3. In a method of preparing transparent, protective coatings on frozen food products in which there is applied to said frozen food products a hot-melt coating composition in molten condition to provide a film on said food products after which the coating composition is allowed to harden, the step which comprises utilizing as the hot-melt coating composition a mixture consisting essentially, in parts by weight, of about 60 parts of an ethylene-vinyl acetate copolymer containing about 28% of vinyl acetate and having a melt index of about 400 to 450, and about 40 parts of a normally liquid, clear, substantially colorless, substantially completely acetylated distilled monoglyceride derived from prime lard.

4. A food product coated with a transparent protective film consisting essentially, in parts by weight, of from about 45 to 60 parts of an ethylene-vinyl acetate copolymer containing from about 22 to 35% of vinyl acetate, and from about 55 to 40 parts of a normally liquid substantially completely acetylated monoglyceride of predominately $C_{14}$–$C_{22}$ fatty acids.

5. A frozen food product coated with a transparent protective film consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

6. Frozen meat coated with a transparent protective film consisting essentially, in parts by weight, of about 60 parts of an ethylene-vinyl acetate copolymer containing about 28% of vinyl acetate and having a melt index of about 400 to 450, and about 40 parts of a normally liquid, clear, substantially colorless, substantially completely acetylated distilled monoglyceride derived from prime lard.

7. A frozen food product encased within a transparent protective film which is substantially odor-free, flexible, and strippable, said film consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

8. An article coated with a transparent protective film consisting essentially, in parts by weight, of from about 45 to 60 parts of an ethylene-vinyl acetate copolymer containing from about 22 to 35% of vinyl acetate, and from about 55 to 40 parts of a normally liquid substantially completely acetylated monoglyceride of predominately $C_{14}$–$C_{22}$ fatty acids.

9. An article coated with a transparent protective film consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

10. An article coated with a transparent protective film consisting essentially, in parts by weight, of about 60 parts of an ethylene-vinyl acetate copolymer containing about 28% of vinyl acetate and having a melt index of about 400 to 450, and about 40 parts of a normally liquid, clear, substantially colorless, substantially completely acetylated distilled monoglyceride derived from prime lard.

11. A coating composition adapted to be applied as a hot melt to articles to provide a transparent substantially odor-free, dry, flexible, strippable coating which comprises a mixture consisting essentially, in parts by weight, of from about 45 to 60 parts of an ethylene-vinyl acetate copolymer containing from about 22 to 35% of vinyl acetate, and from about 55 to 40 parts of a normally liquid substantially completely acetylated monoglyceride of predominately $C_{14}$–$C_{22}$ fatty acids.

12. A coating composition adapted to be applied as a hot melt to articles to provide a transparent substantially odor-free, dry, flexible, strippable coating which comprises a mixture consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

13. A coating composition adapted to be applied as a hot melt to articles to provide a transparent substantially odor-free, dry, flexible, strippable coating which comprises a mixture consisting essentially, in parts by weight, of about 60 parts of an ethylene-vinyl acetate copolymer containing about 28% of vinyl acetate and having a melt index of about 400 to 450, and about 40 parts of a normally liquid, clear, substantially colorless, substantially completely acetylated distilled monoglyceride derived from prime lard.

14. A coating composition adapted to be applied as a hot melt to articles to provide a transparent substantially odor-free, dry, flexible, strippable coating which comprises a mixture consisting essentially, by weight, of from about 45 to 60% of an ethylene-vinyl acetate copolymer containing from about 26 to 30% of vinyl acetate and having a melt index between 125 and 500, and from about 55 to 40% of a normally liquid substantially completely acetylated distilled monoglyceride of predominately $C_{16}$–$C_{18}$ fatty acids.

15. A coating composition adapted to be applied as a hot melt to articles to provide a transparent substantially odor-free, dry, flexible, strippable coating which comprises a mixture consisting essentially, by weight, of about 60% of an ethylene-vinyl acetate copolymer containing about 28% of vinyl acetate and having a melt index of about 400 to 450, and the balance a normally liquid, clear, substantially colorless, substantially completely acetylated distilled monoglyceride of predominately $C_{16}$–$C_{18}$ fatty acids.

16. A transparent film which is substantially odor-free, dry and flexible made of a mixture consisting essentially, in parts by weight, of from about 45 to 60 parts of an ethylene-vinyl acetate copolymer containing from about 22 to 35% of vinyl acetate, and from about 55 to 40 parts of a normally liquid substantially completely acetylated monoglyceride of predominately $C_{14}$–$C_{22}$ fatty acids.

17. A transparent film which is substantially odor-free, dry and flexible made of a mixture consisting essentially, in parts by weight, of from about 45 to 60 parts of an ethylene-vinyl acetate copolymer containing from about 26 to 30% of vinyl acetate and having a melt index of about 125 to 500, and from about 55 to 40 parts of a normally liquid substantially completely acetylated monoglyceride of predominately $C_{16}$–$C_{18}$ fatty acids.

18. A transparent film which is substantially odor-free, dry and flexible made of a mixture consisting essentially, in parts by weight, of about 60 parts of an ethylene-vinyl acetate copolymer containing about 28% of vinyl acetate and having a melt index of about 400 to 450, and about 40 parts of a normally liquid, clear, substantially colorless, substantially completely acetylated distilled monoglyceride derived from prime lard.

References Cited

UNITED STATES PATENTS

| | | | |
|---|---|---|---|
| 3,000,748 | 9/1961 | Clark | 106—180 |
| 3,132,027 | 5/1964 | Norton et al. | 99—169 |
| 3,141,778 | 7/1964 | Thompson et al. | 99—166 |
| 3,158,488 | 11/1964 | Firth | 99—109 |
| 3,192,057 | 6/1965 | Hines et al. | 106—15 |
| 3,207,716 | 9/1965 | Lippoldt | 260—23 |
| 3,245,930 | 4/1966 | McDowell et al. | 260—28.5 |
| 3,247,142 | 4/1966 | Brunson et al. | 260—23 |
| 3,248,232 | 4/1966 | Krajewski | 99—194 |

DONALD E. CZAJA, *Primary Examiner.*

R. A. WHITE, *Assistant Examiner.*